July 22, 1952  M. G. HUBEN  2,604,276
PUSHER POWER PLANT FOR AIRPLANES
Filed Sept. 12, 1950  2 SHEETS—SHEET 1

INVENTOR
MICHAEL G. HUBEN

By Herbert E. Metcalf
HIS PATENT ATTORNEY

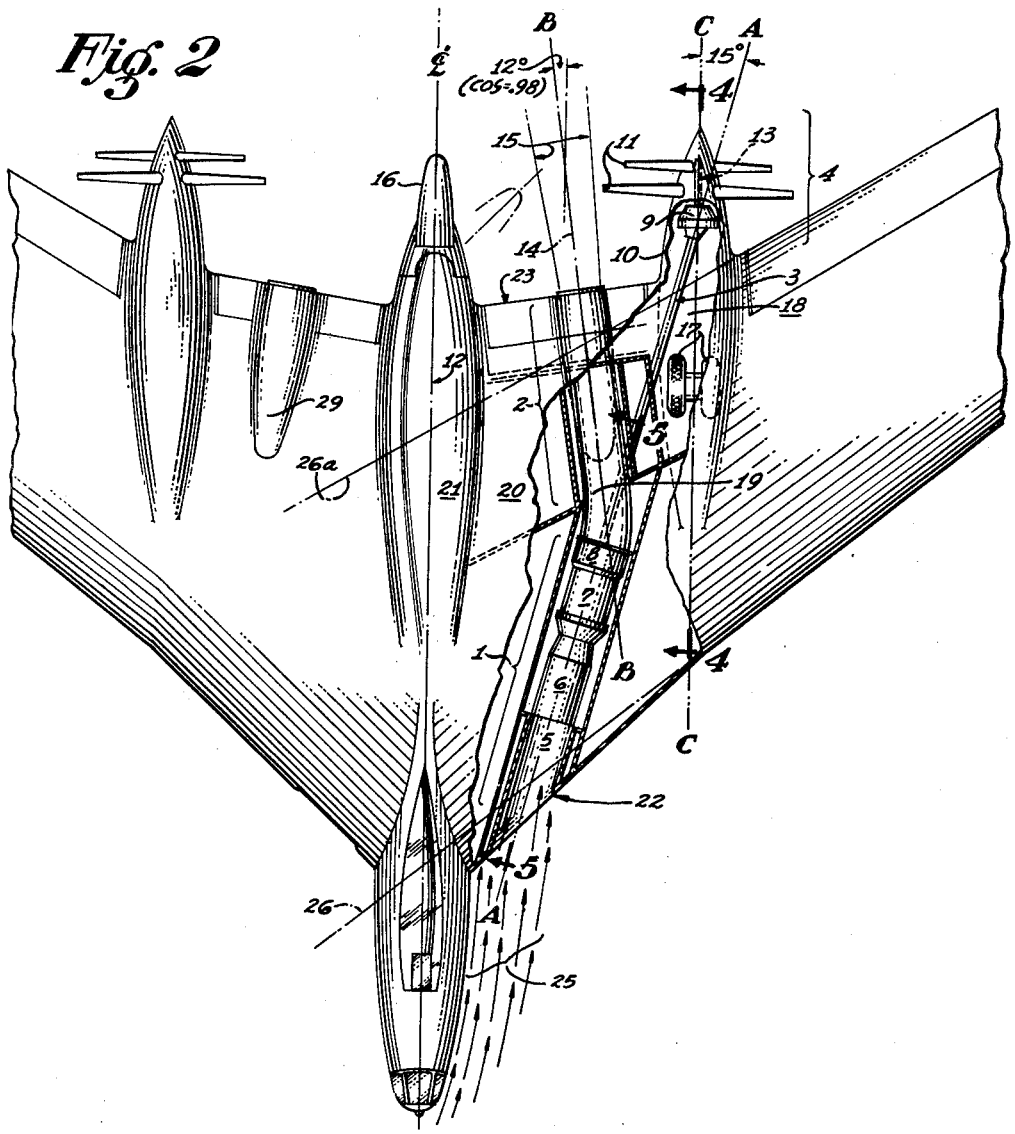

Patented July 22, 1952

2,604,276

UNITED STATES PATENT OFFICE 2,604,276

PUSHER POWER PLANT FOR AIRPLANES

Michael G. Huben, Los Angeles, Calif., assignor to Northrop Aircraft, Inc., Hawthorne, Calif., a corporation of California Application September 12, 1950, Serial No. 184,365

12 Claims. (Cl. 244—15)

The present invention relates to gas turbine propulsion systems for aircraft, and, more particularly, to an improved aircraft propulsion system utilizing both jet and pusher propeller thrust.

One of the major difficulties in designing a pusher propeller installation in aircraft, when a gaseous combustion turbine is used as a prime mover, is to prevent mutual interference between the pusher propellers and the jet without seriously reducing either jet or propeller thrust. Exhaust of the jet through the propeller blades may introduce vibrational problems, cooling problems or both, and simultaneous jet interference. Deflection of the jet gases in a lateral plane to points beyond the propeller radius calls for an excessive sacrifice of wing space in order to accommodate a gas duct of sufficient length and volume to carry the exhaust gases to a safe distance outboard the propeller shaft housing. Lateral deflection inboard usually is not feasible due to the nearness of the fuselage or of fuselage-appendices such as rotatable tailgun turrets, etc. In addition, the introduction of pronounced bends in the exhaust pipe, or placing the exhaust vent at a considerable angle to the line of flight, either in a vertical or in a horizontal plane, leads to losses in jet thrust and to other disturbing effects, such as back pressure on the turbine, thereby also reducing propeller thrust.

Prior art attempts to minimize interference between jet exhaust gases and propellers in pusher-type turbo-propeller jet-engine power plants have not primarily been concerned with improvements in the physical orientation of the units of the propulsion system within the airplane. Normally, the air inlet, gas turbine, propeller shaft, and gear box are aligned parallel to the fore and aft center line of the airplane, and are streamlined by a single fairing. In large airplanes using a modern high speed relatively thin wing sections, the main landing gear components, because of their size, also require a faired enclosure. In piston type engine installation driving pusher propellers, it is usually possible to house the landing gear and wheels in the engine fairing forward of the engine, but in a gas turbine installation of conventional type, no space is available for the landing gear in the power plant fairing, so that ordinarily a separate fairing would be required for the landing gear, thereby adding to the overall drag of the airplane.

It is an object of the present invention to provide a turbo-prop power plant installation in aircraft, in which satisfactory separation between the jet exhaust gases and the propellers is obtained, thereby eliminating interference between these elments.

A further object of this invention is to achieve such a separation with a minimum of loss in effective jet thrust, or loss in propulsive force of the pusher propellers.

Another object of this invention is to provide an enlarged unobstructed space within the propeller gear box fairing for accommodating the main landing gear in its retracted position.

An additional advantage of the present invention is derived from alignment of the longitudinal axis of the air-intake-duct with the general direction of airflow around the airplane in flight, when swept-back wings are used. This alignment yields a further advantage by making it possible to submerge the forward portion of the jet engine power plant entirely within the wing contour of the aircraft.

In general terms, the above mentioned objectives and advantages of the present invention have been attained by a departure from the conventional orientation of the various components of a turbo-prop power plant along a fore-aft axis parallel to the center line of the aircraft. A common axis for the forward section of the power plant and the propeller drive shaft is retained, but this axis has been displaced so that it forms a small angle with the center line of the airplane. A bevel gear or the like connects the drive shaft with the propeller gear box, and the gear box fairing remains in its traditional fore-aft orientation. This new position of the drive shaft and power plant places the major portion of the propeller shaft outside of the gear box fairing, thus providing adequate space in that fairing for the retracted main landing gear. Introducing an oblique jet engine-drive shaft axis has also made it practicable to establish an exhaust path for the combustion gases which falls entirely outside the periphery of the rotating propeller tips. The exhaust jet is directed at only a slight angle to the line of flight, and the required bend in the exhaust duct, likewise, is reduced to a negligible minimum. The forward portion of the jet engine pusher propeller combination comprising the air-intake-duct, air compressor, combustion chamber and turbine, as well as the jet exhaust duct in the rear portion of the wing, are conveniently moved closer to the wing root where these components fit almost entirely into the wing. The power plants are positioned symmetrically on opposite sides of the center line of the airplane and are minor copies.

The present invention will be more fully understood by reference to the appended drawings in which:

Figure 2 is an enlarged diagram of the central portion of Figure 1 with a more detailed, sectional plan view of the improved power plant orientation of the present invention.

The present invention will be described in its application to an all-wing airplane of the Northrop type equipped with two 10,000 shaft horsepower gas turbine engines, each driving contra-rotating pusher propellers. Such engines are currently being built and operated under the trade-marked name of "Turbodyne" by the assignee of the present invention.

Figure 1:
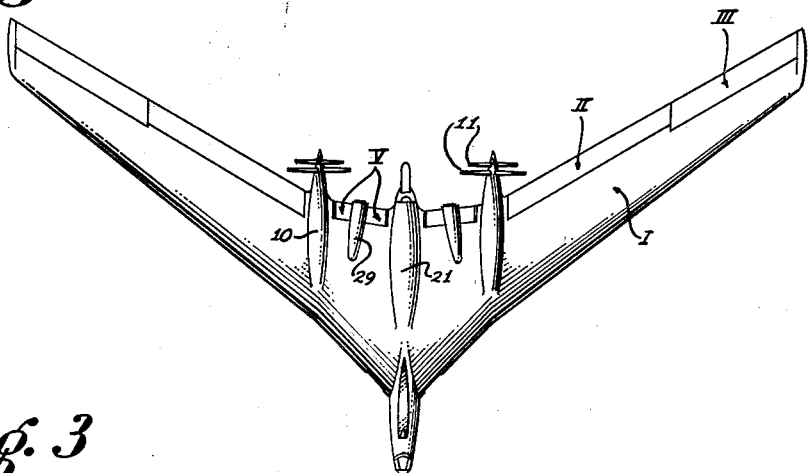
Figure 1 is a schematic plan view of a Northrop type all-wing airplane with swept-back wing panels showing two gaseous combustion turbine power plants installed in accordance with the present invention.

A general top plan view of a Northrop type all-wing aircraft with swept-back wings is given in the diagram of Figure 1 wherein two power plants are symmetrically installed in accordance with the features of the present invention. In this diagram, numeral I designates the swept-back type of wing of this all-wing craft, numeral II the elevon which is a combination of elevator and aileron, and numeral III a type of drag control surface which takes the place of the rudder in aircraft of conventional build. The power plant units of this improved propulsion system are partly concealed within the wing panels. The overall functions of these units will be described more in detail with reference to Figure 2. Clearly visible portions of this system are air inlets 5, fairings 29 which envelop the jet exhaust ducts, gear box fairing 10 whose forward sections harbour the retracted main landing gears, and contra-rotating pusher propellers 11. Landing flaps V on each side of a central fuselage 21 consists of single flaps which pass around the bottom portions of duct fairings 29.

A more detailed view of the power plant arrangement of Figure 1 is presented in the top-plan diagram of Figure 2. The cut away view in the right hand portion of Figure 2 shows a preferred form of propulsion system installation embodying the present invention. For convenience of illustration, the power plant is here subdivided into four major portions. Portion I constitutes the gas turbine unit, portion 2 the jet exhaust unit, portion 3 the drive shaft and portion 4 the pusher propeller unit. In the gas turbine unit I, the air which enters an inlet duct 5 is compressed in a compressor section 6, heated in a combustion section 7 and expanded in a turbine section 8, which contains a multi-stage turbine wheel to provide power to drive propeller drive shaft 3, in addition to driving the compressor 6 to which the turbine is connected by a common shaft. Drive shaft 3 terminates in gear box 9 located within the rear portion of the gear box fairing 10. This gear box includes a suitable form of bevel gear, or the like, which transmits the rotational force of shaft 3 to customary reduction gears and to two concentric propeller shafts 13 on which are mounted the three bladed contra-rotating propellers 11. A blade feathering device may be provided within the propeller hubs so that the blades can be feathered or even reversed in pitch if desired, as is customary in turbo-prop installations.

In contrast with the general power plant orientation of conventional pusher installations along a fore-aft axis parallel to the center line axis 12, the common axis A through portions I and 3 in Figure 2 is shown to be oblique with respect to the center line 12, a preferred angle being about 15° to the center line of the airplane. Axis C, which runs longitudinally through the center of gear box fairing 10 and coincides with the axes of the concentric propeller shafts 13 emanating from the rear portion of gear box 9, is retained in its customary fore-aft position parallel with center line 12. The longitudinal axis B through the jet exhaust unit 2, in turn, has been rotated in a sense opposite to the rotation of the common axis A through portions I and 3 and to a sufficient extent so as to provide a path for exhaust cone 15 which clears all portions of the propeller unit 4 and a tail turret-unit 16 located on the end of fuselage 21. The schematic representation of Figure 2 shows convincingly how, according to the present invention, the novel orientation of axes A and B introduces advantages which have been absent in prior conventional installations. A line connecting axis B and axis C is preferably parallel with the planar extent of the wing.

Figure 5:
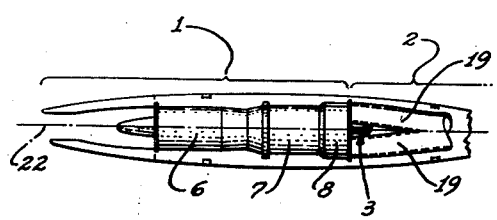
Figure 5 is a cross sectional view in elevation as per section 5 of Figure 2.
Figure 4:
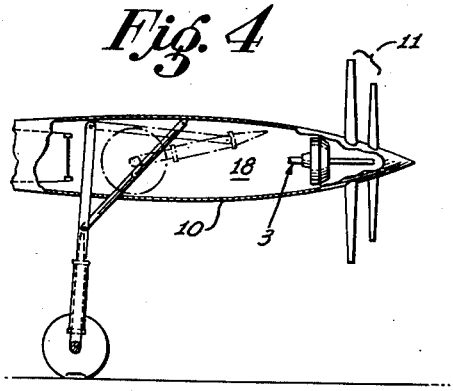
Figure 4 is a longitudinal cross section in elevation through the center of the extended propeller gear box fairing taken as indicated by line 4—4 in Figure 2, and showing diagrammatically the main landing gear units in retracted position within the space provided by the removal of the propeller drive shaft from this area.

Only a small portion of drive shaft 3 remains inside the space 19 occupied by the exhaust duct of unit 2 and, similarly, the main portion of space 18 inside the gear box fairing 10 is cleared from interference by shaft 3 so that the retracted landing gear 17 can be accommodated therein. Figures 4 and 5, which give cut away elevation views along axes C and A, respectively, of the power plant installation, as indicated by lines 4—4 and 5—5 of Figure 2, further illustrate the manner in which the removal of shaft 3 from areas 18 and 19 facilitates installation of the main landing gear unit 17 and the exhaust gas duct of portion 2.

Structurally, as well as aerodynamically, the shift of power plant units I and 2 towards the wing root region 20 near fuselage 21 (Figure 2) is very desirable. In the preferred embodiment of the present invention, the chord or wing depth dimensions of this wing region 20, between fuselage 21 and axis C, have been somewhat increased over the dimensions which would result from a more conventional constant rate of increase in wing depth toward the fuselage. Lines 26 and 26a in Figure 2 serve to illustrate this point by marking out portions of the intake and exhaust ducts which extend beyond these lines of conventional increase in wing depth and which are flush with the wing's newly outlined leading and trailing edges 22 and 23. This extension of wing chord dimensions is accompanied by a proportionate increase in wing thickness as explained below with reference to Figure 3. A definite ratio of wing thickness to wing chord is thus preserved.

Figure 3:
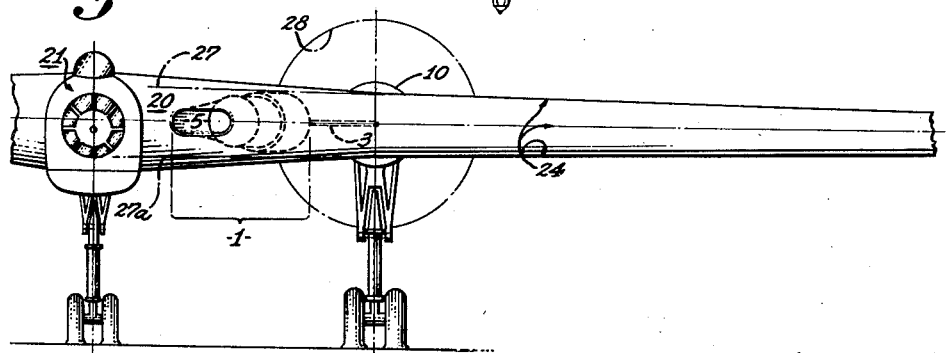
Figure 3 is a diagrammatic front elevation view of the general power plan orientation of Figure 2.

Figure 3 is a diagrammatic representation, in front elevation view, of portions of an aircraft which incorporates the preferred power plant installation shown in Figure 2. In this diagram, the gas turbine unit I of Figure 2 with air-intake-duct 5, as well as drive shaft 3, can be seen in their oblique position entirely inside wing structure 24. Numeral 10 indicates housing 10, and circle 28 outlines the circular area occupied by the propeller blades in rotation, commonly designated as propeller "disc." Lines 27 and 27a portray the normal rate of increase in wing thickness from wing tip (not shown) to fuselage 21 and serve to mark out the added thickness of wing portion 20 referred to in the previous paragraph.

These expansions in the depth and thickness dimensions of the wing root profile help to conceal power plant units 1 and 2 entirely within the wing body except at the trailing edge thereof, which results in an aerodynamically clean wing surface as demonstrated in the left-hand plan view portion of Figure 2 in which the small extent of the exhaust duct fairing at the wing's trailing edge is outlined by contour 29.

The general direction of airflow in the vicinity of the leading wing root (Figure 2), as viewed from above when the aircraft is in flight and this airflow is illustratively suggested by lines 25, is apt to follow a path in the average oblique direction of the intake duct 5. Obviously, this alignment between airstream and air intake axis tends to increase the mass of air scooped by air intake 22 and minimizes frictional losses caused by the impact of air upon surfaces within the intake aperture which would otherwise form an appreciable angle with the direction of air-influx.

Referring further to Figure 2, it is pointed out that in the preferred power plant installation of the present invention, the exhaust jet is directed at a slight angle to the general line of flight. In the installation shown in Figure 2, axis 14 of exhaust cone 15 can be seen to form an angle of approximately twelve degrees with an imaginary axis drawn parallel to the center line axis 12 of the aircraft and assumed to represent the drift-free flight direction of the airplane. Losses in jet-thrust originating from such a small average angle of deflection of the exhaust gases can be considered insignificant as demonstrated in the examples given below. Therefore, it is preferable to construct a straight exhaust duct with a single small bend in its forward portion and to install this duct in a slightly oblique position, rather than, for example, to build a straight exhaust duct with two pronounced bends in its forward portion and to install the straight portion of such a duct parallel with the center line of the airplane or to install a curved duct. Of the total 10,000 shaft horsepower (H. P.) available at the turbine 8, a varying amount of from five percent to thirty percent may be utilized for jet propulsion depending on variations in the power consumption of the pusher propellers which, inturn, is influenced by changes in altitude, propeller-pitch, air speed, etc. A twelve degree jet deviation angle preserves approximately 98 percent of the available jet-thrust. Thus, if 5 percent of the total turbine power or 500 horsepower are available for jet propulsion, an average of approximately 490 horsepower is actually converted into jet-thrust. If we assume, in another example, that 70 percent or 7000 horsepower of the total of 10,000 turbine horsepower go into the pusher-propellers and 30 percent or 3000 horsepower into the jet exhaust, approximately 98 percent of these 30 percent, or about 2940 horsepower, will actually be utilized for jet propulsion.

A similar condition prevails with regard to possible mechanical losses resulting from the angular connection between drive shaft 3 and gear box 9. These losses constitute only a small fraction of the normal mechanical losses encountered in the reduction gears and other parts of gear box 9. Compared to the salient gains achieved by the novel features of this power plant installation, the added mechanical losses, as well as the slight decrease in effective jet-thrust, are of practically no consequence.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In an airplane, a pusher propeller power plant symmetrically positioned in the wings of said airplane on each side of the longitudinal center line of said airplane, said power plants being mirror copies and each comprising a reduction gear mounted adjacent the trailing edge of a wing, a pusher propeller driven by said gear, the rotational axes of said gear and said propeller being parallel to the center line of said airplane, a gaseous combustion turbine positioned within the forward portion of said wing closer to said center line than said gear, the rotational axis of said turbine being at an acute rearward angle with said center line, said turbine axis when projected rearwardly intersecting the axis of said gear at the forward end thereof, a drive shaft connecting said turbine and said gear along the projected axis of said turbine, a jet exhaust duct connected to the rear of said turbine and bent toward the center line of said airplane to open adjacent the trailing edge of said airplane at a point where the jet emerging at said jet duct opening will clear the rotational disc of said propeller, and an air inlet for said turbine adjacent the leading edge of said wing.

2. In an airplane, a pusher propeller power plant symmetrically positioned in the wings of said airplane on each side of the longitudinal center line of said airplane, said power plants being mirror copies and each comprising a reduction gear mounted adjacent the trailing edge of a wing, a pusher propeller driven by said gear, the rotational axes of said gear and said propeller being parallel to the center line of said airplane, a gaseous combustion turbine positioned within the forward portion of said wing closer to said center line than said gear, the rotational axis of said turbine being at an acute rearward angle with said center line, said turbine axis when projected rearwardly intersecting the axis of said gear at the forward end thereof, a drive shaft connecting said turbine and said gear along the projected axis of said turbine, a jet exhaust duct connected to the rear of said turbine and bent toward the center line of said airplane to open adjacent the trailing edge of said airplane at a point where the jet emerging at said jet duct opening will clear the rotational disc of said propeller, an air inlet for said turbine in the leading edge of said wing, and an air duct coaxial with said turbine and drive shaft connecting said air inlet and said turbine.

3. In an airplane having a central fuselage and swept-back wings, a pusher propeller power plant symmetrically positioned in said wings on each side of said fuselage, said power plants being mirror copies and each comprising a reduction gear mounted adjacent the trailing edge of a wing, a pusher propeller driven by said gear, the rotational axes of said gear and said propeller being parallel to the center line of said airplane, a gaseous combustion turbine positioned within the forward portion of said wing closer to said fuselage than said gear, the rotational axis of said turbine being at an acute rearward angle with said center line, said turbine axis when projected rearwardly intersecting the axis of said gear at the forward end thereof, a drive shaft connecting said turbine and said gear along the projected axis of said turbine, a jet exhaust duct connected to the rear of said turbine and bent toward the center line of said airplane to open adjacent the trailing edge of said airplane at a point where the jet cone emerging at said jet duct opening is between the fuselage and the rotational disc of said propeller, and an air inlet for said turbine adjacent the leading edge of said wing.

4. In an airplane having a central fuselage and swept-back wings, a pusher propeller power plant symmetrically positioned in said wings of said airplane on each side of said fuselage, said power plants being mirror copies and each comprising a reduction gear mounted adjacent the trailing edge of a wing, a pusher propeller driven by said gear, the rotational axes of said gear and said propeller being parallel to the center line of said airplane, a gaseous combustion turbine positioned within the forward portion of said wing closer to said fuselage than said gear, the rotational axis of said turbine being at an acute rearward angle with said center line, said turbine axis when projected rearwardly intersecting the axis of said gear at the forward end thereof, a drive shaft connecting said turbine and said gear along the projected axis of said turbine, a jet exhaust duct connected to the rear of said turbine and bent toward the center line of said airplane to open adjacent the trailing edge of said airplane at a point where the jet cone emerging at said jet duct opening is between the fuselage and the rotational disc of said propeller, an air inlet for said turbine in the leading edge of said wing, and a duct extending coaxially with said turbine and said drive shaft connecting said air inlet and said turbine.

5. In an airplane, a pusher propeller power plant symmetrically positioned in the wings of said airplane on each side of the longitudinal center line of said airplane, said power plants being mirror copies and each comprising a reduction gear mounted adjacent the trailing edge of a wing, a pusher propeller driven by said gear, the rotational axes of said gear and said propeller being parallel to the center line of said airplane, a gaseous combustion turbine positioned within the forward portion of said wing closer to said center line than said gear, the rotational axis of said turbine being at an acute rearward angle with said center line, said turbine axis when projected rearwardly intersecting the axis of said gear at the forward end thereof, a drive shaft connecting said turbine and said gear along the projected axis of said turbine, a jet exhaust duct connected to the rear of said turbine and bent adjacent said rear toward the center line of said airplane and then extending along a straight axial line to open adjacent the trailing edge of said airplane at a point where the jet emerging at said jet duct opening will clear the rotational disc of said propeller, and an air inlet for said turbine adjacent the leading edge of said wing.

6. In an airplane, a pusher propeller power plant symmetrically positioned in the wings of said airplane on each side of the longitudinal center line of said airplane, said power plants being mirror copies and each comprising a reduction gear mounted adjacent the trailing edge of a wing, a pusher propeller driven by said gear, the rotational axes of said gear and said propeller being parallel to the center line of said airplane, a gaseous combustion turbine positioned within the forward portion of said wing closer to said center line than said gear, the rotational axis of said turbine being at an acute rearward angle with said center line, said turbine axis when projected rearwardly intersecting the axis of said gear at the forward end thereof, a drive shaft connecting said turbine and said gear along the projected axis of said turbine, a jet exhaust duct connected to the rear of said turbine and bent adjacent said rear toward the center line of said airplane and then extending along a straight axial line at an angle of about 12° to said center line to open adjacent the trailing edge of said airplane at a point where the jet emerging at said jet duct opening will clear the rotational disc of said propeller, and an air inlet for said turbine adjacent the leading edge of said wing.

7. In an airplane, a pusher propeller power plant symmetrically positioned in the wings of said airplane on each side of the longitudinal center line of said airplane, said power plants being mirror copies and each comprising a reduction gear mounted adjacent the trailing edge of a wing, a pusher propeller driven by said gear, the rotational axes of said gear and said propeller being parallel to the center line of said airplane, a gaseous combustion turbine positioned within the forward portion of said wing closer to said center line than said gear, the rotational axis of said turbine being at an acute rearward angle of about 15° with said center line, said turbine axis when projected rearwardly intersecting the axis of said gear at the forward end thereof, a drive shaft connecting said turbine and said gear along the projected axis of said turbine, a jet exhaust duct connected to the rear of said turbine and bent adjacent said rear toward the center line of said airplane and then extending along a straight axial line at an angle of about 12° to said center line to open adjacent the trailing edge of said airplane at a point where the jet emerging at said jet duct opening will clear the rotational disc of said propeller, an air inlet for said turbine adjacent the leading edge of said wing, and an air inlet duct coaxial with said turbine and drive shaft connecting said air inlet and said turbine.

8. In an airplane, a pusher propeller power plant symmetrically positioned in the wings of said airplane on each side of the longitudinal center line of said airplane, said power plants being mirror copies and each comprising a reduction gear box mounted adjacent the trailing edge of a wing, a pusher propeller driven from said gear box, a fairing for said gear box and extending forwardly over and under said wing, the rotational axes of said gear box and said propeller being parallel to the center line of said airplane, a gaseous combustion turbine positioned within the forward portion of said wing closer to said center line than said gear and fairing therefor, the rotational axis of said turbine being at an acute rearward angle with said center line and when projected rearwardly entering said fairing adjacent said gear box and intersecting the axis of said gear box at the forward end thereof, a drive shaft connecting said turbine and said gear along the projected axis of said turbine, a landing gear component housed in said fairing forward of that portion of the drive shaft in said fairing, a jet exhaust duct connected to the rear of said turbine and bent toward the center line of said airplane prior to reaching said fairing to open adjacent the trailing edge of said airplane at a point where the jet emerging at said jet duct opening will clear the rotational disc of said propeller, and an air inlet for said turbine adjacent the leading edge of said wing.

9. An airplane, a pusher propeller power plant symmetrically positioned in the wings of said airplane on each side of the longitudinal center line of said airplane, said power plants being mirror copies and each comprising a reduction gear and box mounted adjacent the trailing edge of a wing, a pusher propeller driven by said gear, a fairing for said gear box and extending forwardly over and under said wing, the rotational axes of said gear box and said propeller being parallel to the center line of said airplane, a gaseous combustion turbine positioned within the forward portion of said wing closer to said center line than said gear and fairing therefor, the rotational axis of said turbine being at an acute rearward angle with said center line and when projected rearwardly entering said fairing adjacent said gear and intersecting the axis of said gear at the forward end thereof, a drive shaft connecting said turbine and said gear along the projected axis of said turbine to leave the forward portion of said fairing free to house other airplane components, a jet exhaust duct connected to the rear of said turbine and bent toward the center line of said airplane prior to reaching said fairing to open adjacent the trailing edge of said airplane at a point where the jet emerging at said jet duct opening will clear the rotational disc of said propeller, and an air inlet for said turbine adjacent the leading edge of said wing.

10. An airplane, a pusher propeller power plant symmetrically positioned in the wings of said airplane on each side of the longitudinal center line of said airplane, said power plants being mirror copies and each comprising a reduction gear box mounted adjacent the trailing edge of a wing, a pusher propeller driven by said gear box, a fairing for said gear box and extending forwardly over and under said wing, the rotational axes of said gear box and said propeller being parallel to the center line of said airplane, a gaseous combustion turbine positioned within the forward portion of said wing closer to said center line than said gear box and fairing, the rotational axis of said turbine being at an acute rearward angle of about 15° with said center line and when projected rearwardly entering said fairing adjacent said gear and intersecting the axis of said gear at the forward end thereof, a drive shaft connecting said turbine and said gear along the projected axis of said turbine, a landing gear component housed in said fairing forward of that portion of the drive shaft in said fairing, a jet exhaust duct connected to the rear of said turbine and bent at an angle of about 12° toward the center line of said airplane prior to reaching said fairing to open adjacent the trailing edge of said airplane at a point where the jet emerging at said jet duct opening will clear the rotational disc of said propeller, an air inlet for said turbine adjacent the leading edge of said wing, and a duct coaxial with said turbine and drive shaft connecting said air inlet and said turbine.

11. An airplane having a central fuselage and wings attached thereto, a pusher propeller power plant symmetrically positioned in the wings of said airplane on each side of the longitudinal center line of said airplane, said power plants being mirror copies and each comprising a reduction gear mounted adjacent the trailing edge of a wing, a pusher propeller driven by said gear box, the rotational axes of said gear box and said propeller being parallel to the center line of said airplane, a gaseous combustion turbine positioned within the forward portion of said wing closer to said center line than said gear box, the rotational axis of said turbine being at an acute rearward angle with said center line and when projected rearwardly entering said fairing adjacent said gear box and intersecting the axis of said gear box at the forward end thereof, a drive shaft connecting said turbine and said gear along the projected axis of said turbine, a jet exhaust duct connected to the rear of said turbine and bent toward the center line of said airplane prior to reaching said fairing to open adjacent the trailing edge of said airplane at a point where the jet emerging at said jet duct opening will clear the rotational disc of said propeller, an air duct connected to the front end of said turbine and extending forwardly to open in the leading edge of said wing adjacent said fuselage, said fuselage having a portion extending forwardly of said leading edge and shaped to deflect air into said air duct.

12. A pusher propeller power plant for an airplane comprising a reduction gear mounted adjacent the trailing edge of a wing of said airplane, a pusher propeller driven by said gear, the rotational axes of said gear and said propeller being parallel to the center line of said airplane, a gaseous combustion turbine positioned within the forward portion of said wing closer to said center line than said gear, the rotational axis of said turbine being at an acute rearward angle with said center line and when projected rearwardly intersecting the axis of said gear at the forward end thereof, a drive shaft connecting said turbine and said gear along the extended axis of said turbine, and a jet exhaust duct connected to the rear of said turbine and bent toward the center line of said airplane to open adjacent the trailing edge of said airplane at a point where the jet emerging at said jet duct opening will clear the rotational disc of said propeller.

MICHAEL G. HUBEN.

REFERENCES CITED

The following references are of record in the file of this patent:

UNITED STATES PATENTS

| Number | Name | Date |
|---|---|---|
| 2,411,227 | Planiol | Nov. 19, 1946 |